Figure 1:
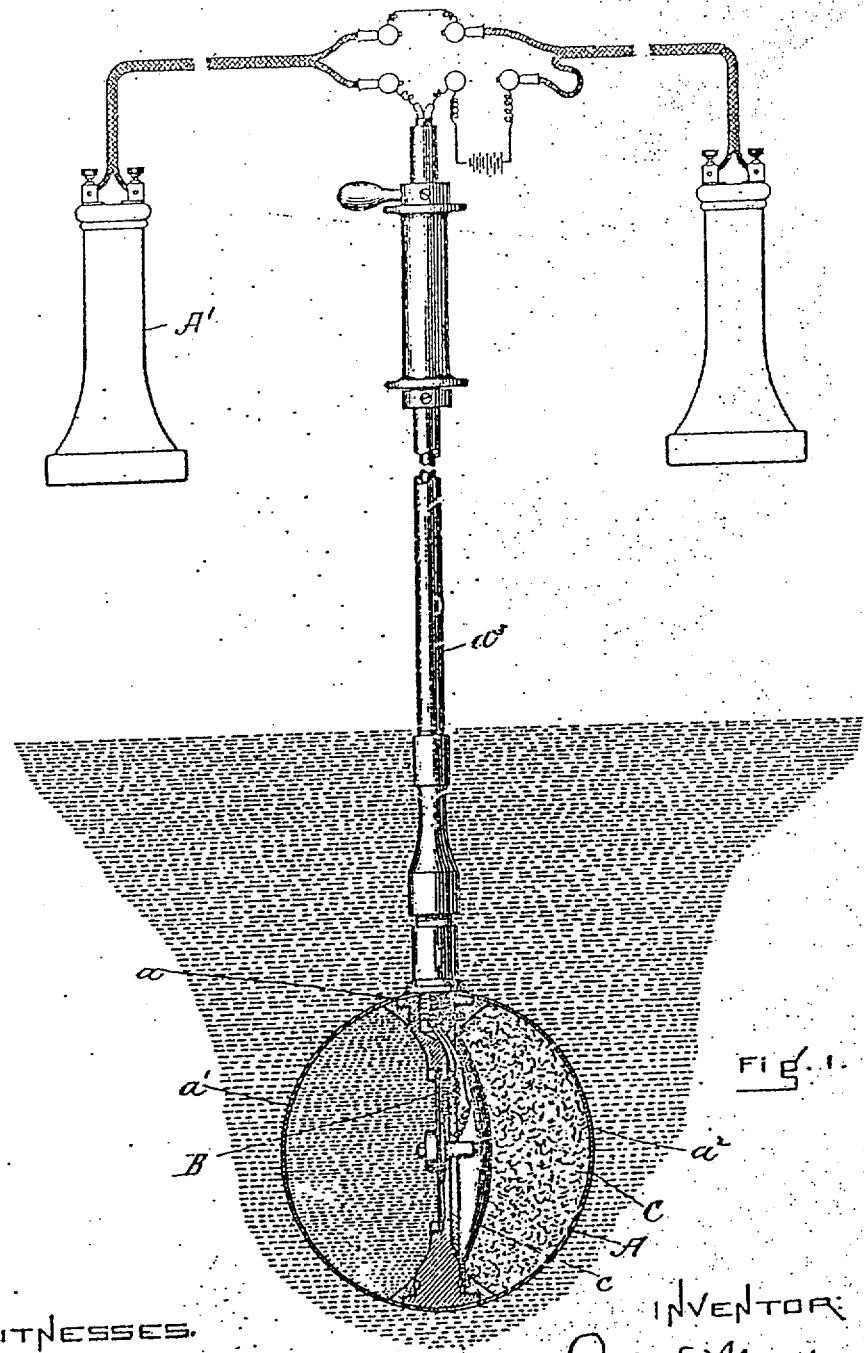

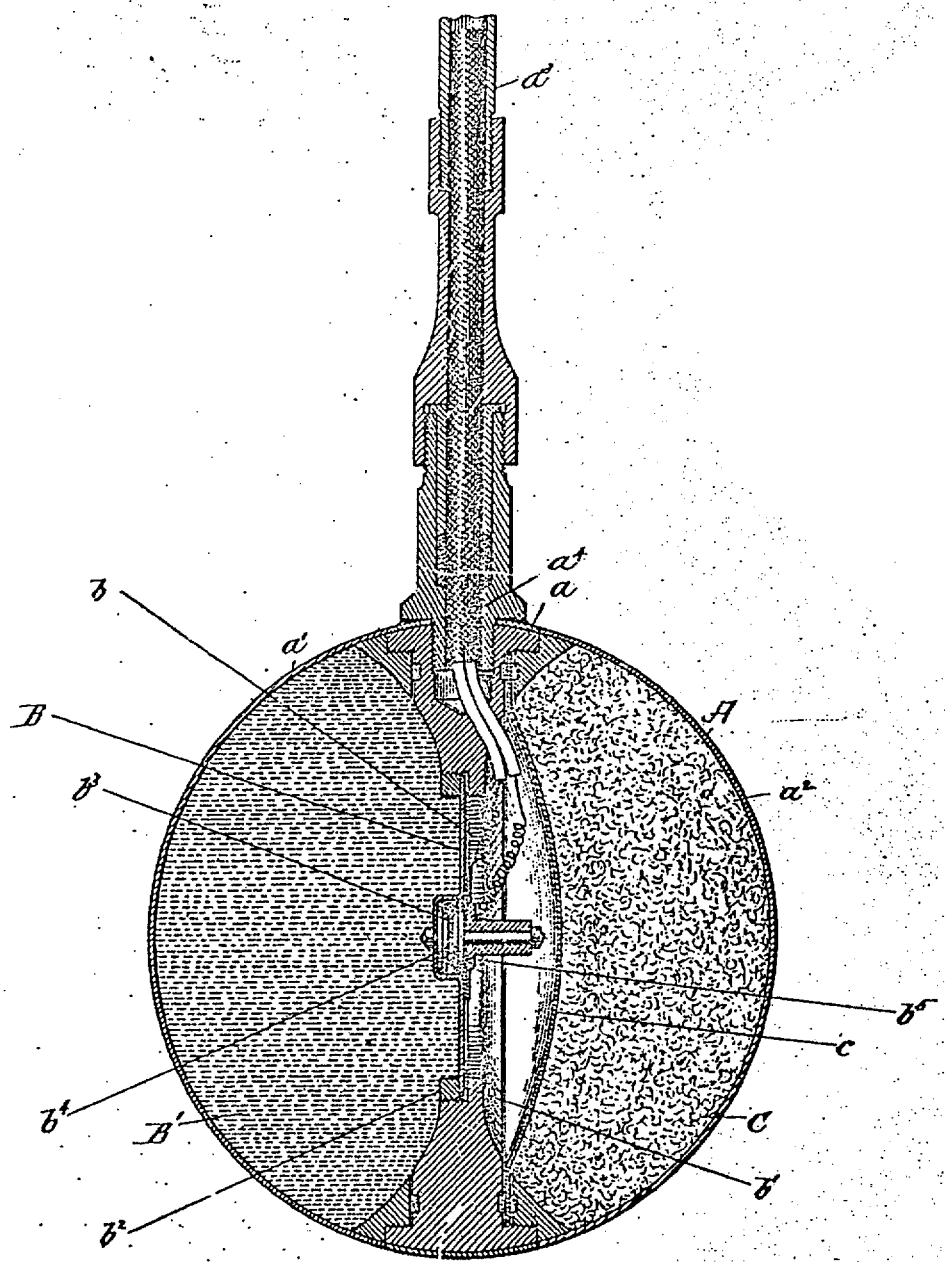

No. 768,573.

Patented August 23, 1904.

UNITED STATES PATENT OFFICE.

ARTHUR J. MUNDY, OF BOSTON, MASSACHUSETTS, ASSIGNOR TO SUBMARINE SIGNAL COMPANY, OF WATERVILLE, MAINE, A CORPORATION OF MAINE.

SUBMARINE SOUND-DIRECTION FINDER.

SPECIFICATION forming part of Letters Patent No. 768,573, dated August 23, 1904.

Application filed April 23, 1902. Serial No. 104,304. (No model.)

*To all whom it may concern:*

Be it known that I, ARTHUR J. MUNDY, a citizen of the United States, and a resident of Boston, in the county of Suffolk and State of Massachusetts, have invented a new and useful Improvement in Submarine Sound-Direction Finders, of which the following is a full, clear, and exact description, reference being had to the accompanying drawings, forming a part of this specification, in explaining its nature.

The purpose of this invention is to provide an apparatus adapted to be submerged in water and to there by its movement in the water and because of its properties ascertain the direction of approach of the sound-signaling vibrations or impulses which the water receives from a sound-signaling station and transmits toward it.

It is desirable in submarine telephony not only to provide for the reception of sound signals or vibrations imparted to water, but also at the same time to ascertain as nearly as possible the direction from which the impulses or vibrations come. This is of special consequence when the sound impulses or vibrations are used for indicating danger-points.

My invention comprises a small compact apparatus, which includes upon one side a zone or section sensitive to sound-vibrations and in operative conjunction with an electric sound-transmitter and which upon the other side is non-receptive to such vibrations or substantially dead to them.

The apparatus is mounted, preferably, in a manner which permits it to be turned in the water to present all its sides in all horizontal directions. It is also connected electrically with a receiver above water and by means of which the sound-vibrations which it receives are transmitted to the hearer. The user determines the direction in which the sound-vibrations are traveling by the variations in the intensity of the sound-signals transmitted to him through the receiver. These may be either the loudest or the faintest so received, or both may be employed in estimating the direction.

I will now describe the invention in conjunction with the drawings forming a part of this specification, wherein—

Figure 1 represents the apparatus as submerged. Fig. 2 shows a portion of it in enlarged vertical section.

Referring to the drawings, A represents a shell, preferably of brass. It is made in any suitable manner, and in the drawings it is shown in the three parts $a$ $a'$ $a^2$, the part $a$ being a central one to which the parts $a'$ $a^2$ are attached, preferably by screwing. I prefer that they be in the form of a shell. I also prefer that it be mounted upon a rod or support $a^3$, by means of which it may be turned in the water on a vertical axis, and also that the rod contain the electric conductor $a^4$, which connects the transmitter contained in the shell with the receiver A'. The receiver may be in duplex form, if desired.

The electric transmitter B is located at or near the center of the shell. It comprises a sound-receiving diaphragm $b$, held by its edge against the shell $b'$ of the central section $a$ by means of a screw-ring $b^2$. This diaphragm supports a means for varying electrical resistance $b^3$ and the electrodes $b^4$ $b^5$. They are mounted upon the diaphragm and are actuated by its vibrations. The face of the diaphragm forms the inner end of a chamber B', the outer boundary of which is formed by the shell of the part $a'$, and it preferably is filled with water. The part $a'$ thus acts to provide the water-chamber. It also protects the transmitter. It also serves to focus vibrations which it receives from the water in which it is submerged upon the diaphragm. This provides the sensitive section of the direction-finder.

The portion of the apparatus back of the transmitter is bounded by the part $a^2$ of the shell, and it is separated from the chamber C thereof by a partition $c$, of rubber or other sound-deadening material, the edge of which is clamped between the part $a^2$ and the central part $a$. The chamber C thus formed is filled with any sound absorbing or deadening material. Among those which may be used I would name "felt." This side of the apparatus therefore serves to prevent the transfer of sound-vibrations from the surrounding water to the transmitter.

When the apparatus is turned so that the transmitter is at right angles to the line of advance of the sound-vibration waves, then it is most sensitive to them and responds with greater amplitude or power, and sound delivered through the receiver is at its loudest. When the apparatus is turned to present its dead side to the sound-wave, the sound-vibrations received by the transmitter have their smallest force or effect and the vibrations delivered by it to the receiver produce the faintest sounds which the apparatus transmits. Between these two extremes the sound varies in force or strength according as it is turned to reach one or the other of the two extremes.

The apparatus may be used in any desired way, either outside of a ship or vessel or in a water-tank or receptacle within it.

Where there is a possibility of the sound being reflected by the side of the vessel, it will be desirable when the direction-finder is so used—that is, outside the vessel—to sink it beneath the keel in order that the reflection of sound may be avoided.

Having thus fully described my invention, I claim and desire to secure by Letters Patent of the United States—

1. A submarine sound-direction finder comprising a submerged apparatus having a side sensitive to the reception and transfer of sound-vibrations from the water and also containing an electric transmitter adapted to receive such vibrations and electrically connected with a sound-receiver, and also having a side which is substantially insensitive to t reception and transfer of sound-vibrations 2. A submarine sound-direction finder co prising a submerged apparatus having an el tric transmitter electrically connected wit sound-receiver and also having upon one si of the transmitter a sound receiving and trai ferring medium and upon the other side the transmitter a sound-deadening mediu and means for turning said apparatus.

3. A submarine sound-direction finder co prising an electric transmitter electrically cc nected with a receiver, a sound-focuser an sound-deadener, the sound-focuser being up one side of the transmitter and the soun deadener upon the other side of it.

4. A submarine sound-direction finder co prising an apparatus having an electric trai mitter electrically connected with a receive a sound-focuser, a sound-conducting mediu between the transmitter and the focuser, a a sound-deadener upon the opposite side the transmitter.

5. A submarine sound-direction finder co prising a spherical case suspended upon t end of a turning rod or device, one section which comprises an electric transmitter el trically connected through the rod with sound-receiver and adapted to transmit soun vibrations received by the case, and mea between the transmitter and a part of the ca for deadening the direct transmission of soun vibrations thereto, whereby the transmitt is more sensitive to vibrations received fro one part of the case than from the other.

ARTHUR J. MUNDY.

Witnesses:
F. F. RAYMOND, 2d,
J. M. DOLAN.